United States Patent
Kim

(10) Patent No.: US 8,999,539 B2
(45) Date of Patent: Apr. 7, 2015

(54) SECONDARY BATTERY INCLUDING SHORT CIRCUIT MEMBER COMPRISING DUCT PART AND DEFORMABLE PART

(71) Applicants: Samsung SDI Co., Ltd., Yongin-si, Gyeonggi-do (KR); Robert Bosch GmbH, Stuttgart (DE)

(72) Inventor: Dukjung Kim, Yongsin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 100 days.

(21) Appl. No.: 13/802,019

(22) Filed: Mar. 13, 2013

(65) Prior Publication Data

US 2014/0193675 A1    Jul. 10, 2014

(30) Foreign Application Priority Data

Jan. 9, 2013    (KR) .................. 10-2013-0002681

(51) Int. Cl.
| | |
|---|---|
| *H01M 2/06* | (2006.01) |
| *H01M 2/08* | (2006.01) |
| *H01M 2/20* | (2006.01) |
| *H01M 2/34* | (2006.01) |
| *H01M 2/12* | (2006.01) |

(Continued)

(52) U.S. Cl.
CPC ............ *H01M 2/345* (2013.01); *H01M 2/1241* (2013.01); *H01M 2/30* (2013.01); *H01M 2/361* (2013.01); *H01M 2200/103* (2013.01); *H01M 2200/20* (2013.01)

(58) Field of Classification Search
USPC .................. 429/61, 72, 82, 178, 161, 163, 59
See application file for complete search history.

(56) References Cited

U.S. PATENT DOCUMENTS

| | | | |
|---|---|---|---|
| 2010/0291421 A1 | 11/2010 | Byun et al. | |
| 2011/0091752 A1* | 4/2011 | Kim et al. | ........................ 429/72 |

(Continued)

FOREIGN PATENT DOCUMENTS

| | | |
|---|---|---|
| JP | 2010-257692 A | 11/2010 |
| KR | 10-2010-0123598 A | 11/2010 |

(Continued)

OTHER PUBLICATIONS

Machine Translation of: JP 2010/257692, Yamazaki et al., Nov. 11, 2010.*

*Primary Examiner* — Kenneth Douyette
(74) *Attorney, Agent, or Firm* — Christie, Parker & Hale, LLP

(57) ABSTRACT

A secondary battery including an electrode assembly; first and second collector plates connected to respective first and second electrodes of the electrode assembly; a case accommodating the electrode assembly, the first collector plate, and the second collector plate; a cap plate sealing an opening of the case; a first electrode terminal electrically connected to the first collector plate and passing through the cap plate; a second electrode terminal electrically connected to the second collector plate and passing through the cap plate; and a short-circuit member electrically connected to the first collector plate and passing through the cap plate, the short-circuit member including a duct part in communication with an inside of the case; and a deformable part covering a top portion of the duct part and being deformable by a gas pressure inside the case to electrically connect the first electrode to the second electrode.

12 Claims, 7 Drawing Sheets

(51) Int. Cl.
*H01M 2/30* (2006.01)
*H01M 2/36* (2006.01)

(56) References Cited

U.S. PATENT DOCUMENTS

2011/0177387 A1* 7/2011 Byun et al. .................. 429/178
2011/0183198 A1   7/2011 Byun et al.
2012/0189884 A1* 7/2012 Guen .............................. 429/82
2012/0251852 A1  10/2012 Kim

FOREIGN PATENT DOCUMENTS

KR   10-2011-0087566 A   8/2011
KR   10-2012-0112991 A  10/2012

* cited by examiner

SECONDARY BATTERY INCLUDING SHORT CIRCUIT MEMBER COMPRISING DUCT PART AND DEFORMABLE PART

CROSS-REFERENCE TO RELATED APPLICATION

This application claims priority to and the benefit of Korean Patent Application No. 10-2013-0002681, filed on Jan. 9, 2013 in the Korean Intellectual Property Office, the entire content of which is incorporated herein by reference.

BACKGROUND

1. Field

Aspects of embodiments of the present invention relate to a secondary battery.

2. Description of the Related Art

In secondary batteries, high-power batteries that use tens of battery cells connected to each other in a battery pack are widely used as power sources for hybrid vehicles or electric vehicles. The secondary battery is generally configured by accommodating an electrode assembly having a positive plate and a negative plate and a separator as an insulator interposed therebetween in a case with an electrolyte, and installing a cap plate having electrode terminals in the case to seal an opening of the case.

However, if excessive heat is generated due to an external short circuit, such as overcharge or puncture, or an internal pressure of the secondary battery increases due to decomposition of an electrolyte, ignition or explosion of the secondary battery may be caused.

SUMMARY

According to an aspect of embodiments of the present invention, a secondary battery includes a short-circuit member for providing safety from external short circuits, such as due to overcharge or puncture.

In accordance with one or more embodiments of the present invention, a secondary battery includes: an electrode assembly including a first electrode, a second electrode, and a separator between the first electrode and the second electrode; a first collector plate connected to the first electrode; a second collector plate connected to the second electrode; a case accommodating the electrode assembly, the first collector plate, and the second collector plate; a cap plate sealing an opening of the case; a first electrode terminal electrically connected to the first collector plate and passing through the cap plate; a second electrode terminal electrically connected to the second collector plate and passing through the cap plate; and a short-circuit member electrically connected to the first collector plate and passing through the cap plate, the short-circuit member including a duct part in communication with an inside of the case; and a deformable part covering a top portion of the duct part and being deformable by a gas pressure inside the case to electrically connect the first electrode to the second electrode.

The short-circuit member may be arranged adjacent to the second electrode terminal and between the first electrode terminal and the second electrode terminal.

The deformable part may be a round part that is convexly formed toward the inside of the case and is inverted toward an outside of the case when the deformable part is deformed.

The cap plate may be electrically insulated from the first electrode terminal, the second electrode terminal, and the short-circuit member.

The first collector plate may include a first connection part connected to the first electrode and having a fuse part, and a first extension part bent and extending from a top portion of the first connection part, the first extension part extending parallel with the cap plate to an end adjacent to the second collector plate.

The fuse part may be adjacent to a corner portion at which the first extension part is bent from the first connection part, and may be melted when an overcurrent flows.

The first extension part may include a first electrode terminal hole receiving the first electrode terminal, a coupling hole receiving the short-circuit member, a vent hole at a location corresponding to a safety vent of the cap plate, and an electrolyte injection hole at a location corresponding to an electrolyte injection part of the cap plate, and the vent hole and the electrolyte injection hole may be between the first electrode terminal hole and the coupling hole.

The coupling hole may be adjacent to the end of the first extension part.

The secondary battery may further include a fastening terminal fastened to the second electrode terminal, and the second fastening terminal may include a short-circuit extension part extending over an upper side of the deformable part.

When the deformable part is deformed, it may make contact with a bottom surface of the short-circuit extension part.

The secondary battery may further include an upper insulation member between the fastening terminal and the cap plate, the upper insulation member including a first receiving groove receiving the fastening terminal, and a second receiving groove receiving the short-circuit member protruding to an outside of the cap plate.

The secondary battery may further include a lower insulation member between the cap plate and each of the first collector plate and the second collector plate, wherein the lower insulation member has penetration holes formed at positions corresponding to the short-circuit member and a first electrode terminal hole, a safety vent, an electrolyte injection part, and a second electrode terminal hole, which are formed in the cap plate.

The secondary battery may further include a fastening terminal fastened to the first electrode terminal, and an upper insulation member between the fastening terminal and the cap plate.

According to an aspect of embodiments of the present invention, in a secondary battery, when an external short circuit, such as due to overcharge or puncture, occurs in a state in which a cap plate and a case are electrically neutralized, a short-circuit member that moves internal gases of the secondary battery may electrically connect a first electrode and a second electrode, causing short circuiting, thereby improving safety of the secondary battery.

According to another aspect of embodiments of the present invention, in a secondary battery, when a large amount of current flows in the battery due to a short circuit, a fuse part may be melted to interrupt a flow of current, thereby suspending charging or discharging of the secondary battery before a dangerous situation, such as ignition or explosion, is caused to the secondary battery.

Additional aspects and/or principles of embodiments of the present invention will be set forth, in part, in the following description and, in part, will be obvious from the description, or may be learned by those skilled in the art by practice of the invention.

BRIEF DESCRIPTION OF THE DRAWINGS

Features and aspects of the present invention will be more apparent from the following detailed description, in which some exemplary embodiments are described in further detail, in conjunction with the accompanying drawings, in which.

DETAILED DESCRIPTION

Some exemplary embodiments of the present invention are described more fully hereinafter with reference to the accompanying drawings; however, embodiments of the present invention may be embodied in different forms and should not be construed as limited to the embodiments set forth herein. As those skilled in the art would realize, the described embodiments may be modified in various different ways, all without departing from the spirit or scope of the present invention. Accordingly, the drawings and description are to be regarded as illustrative in nature and not restrictive.

Figure 1:
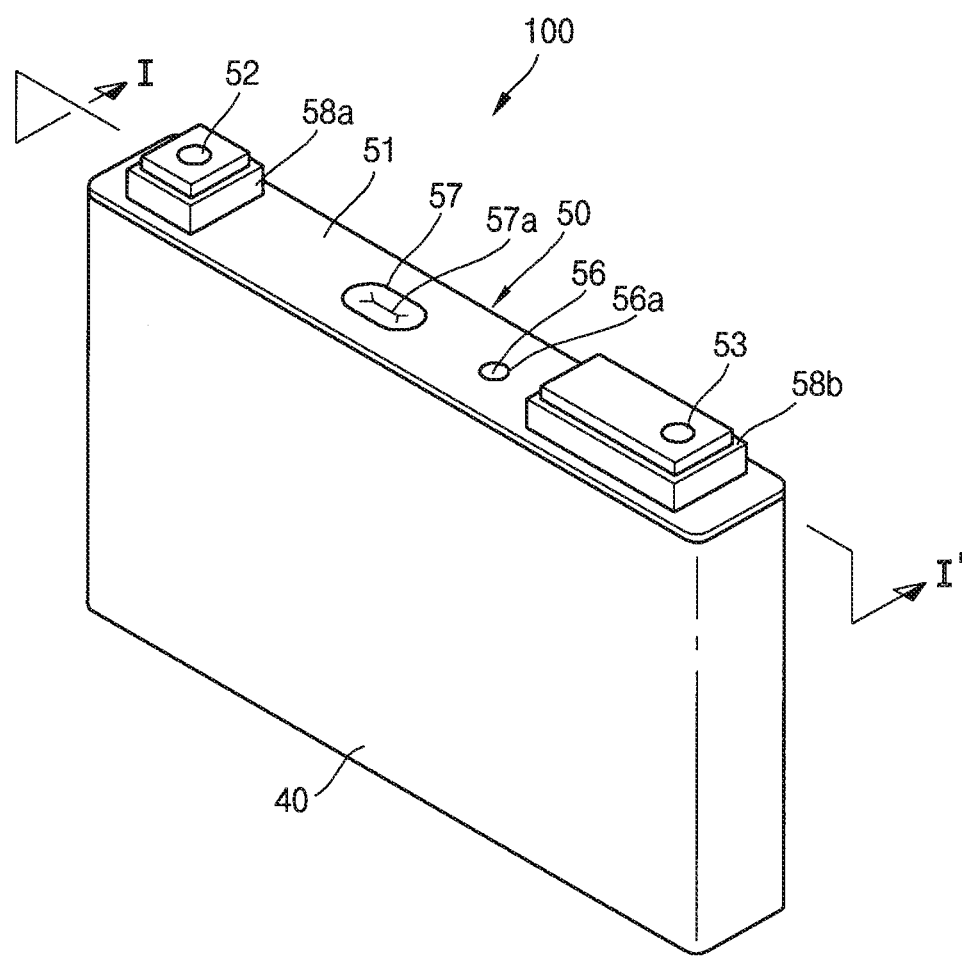
FIG. 1 is a perspective view of a secondary battery according to an embodiment of the present invention.
Figure 2:
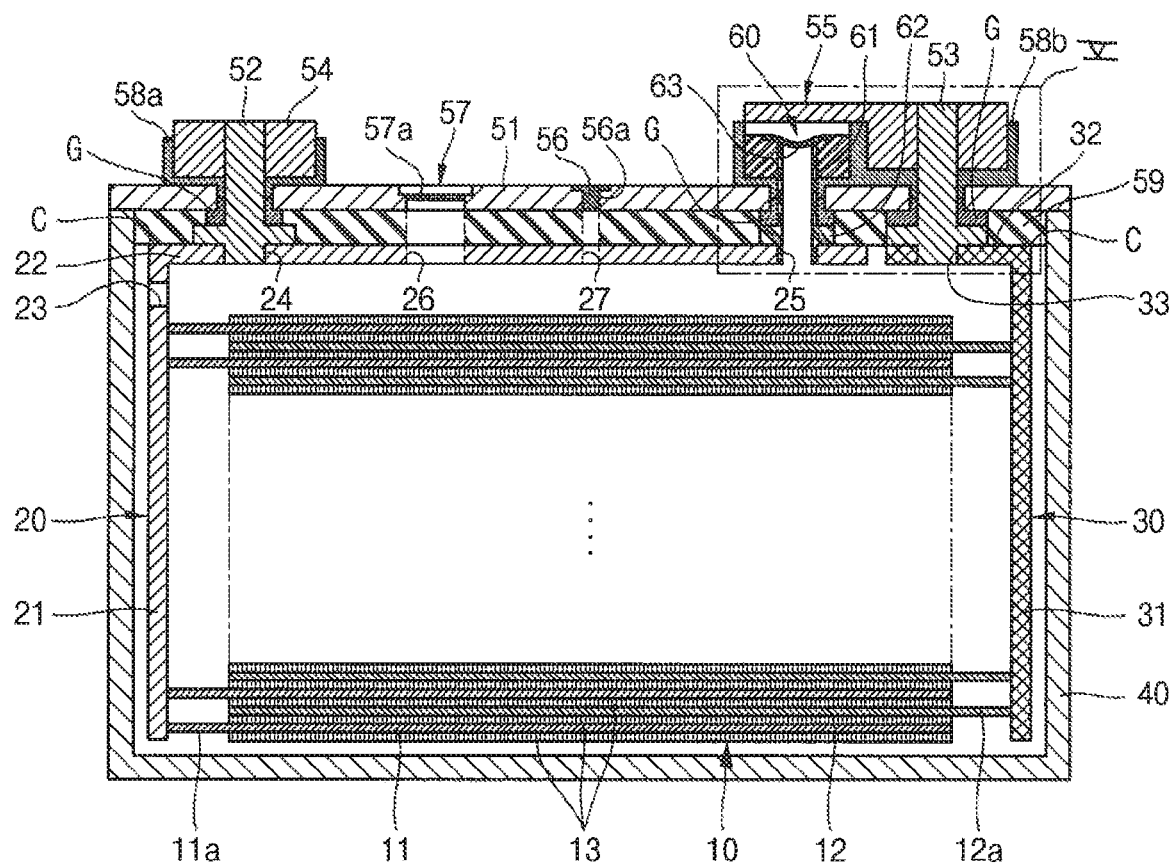
FIG. 2 is a sectional view of the secondary battery of FIG. 1, taken along the line I-I'.

FIG. 1 is a perspective view of a secondary battery according to an embodiment of the present invention; and FIG. 2 is a sectional view of the secondary battery of FIG. 1, taken along the line I-I'.

Referring to FIGS. 1 and 2, a secondary battery 100 according to an embodiment of the present invention includes an electrode assembly 10, a first collector plate 20, a second collector plate 30, a case 40, a cap assembly 50, a first electrode terminal 52, a second electrode terminal 53, and a short-circuit member 60.

The electrode assembly 10 may be formed by winding or stacking the first electrode 11, the separator 13, and the second electrode 12, which have a thin plate or film shape. In one embodiment, the first electrode 11 may function as a positive electrode, and the second electrode 12 may function as a negative electrode. However, in another embodiment, the polarities of the first electrode 11 and the second electrode 12 may be reversed.

The first electrode 11 is formed by applying a first electrode active material to a first electrode collector plate formed of a metal foil, such as an aluminum foil, for example. The first electrode 11 includes a first electrode non-coating portion 11a to which the first electrode active metal is not applied. The first electrode non-coating portion 11a functions as a current flow path between the first electrode 11 and an outside of the first electrode 11. However, according to embodiments of the present invention, materials that can be used to form the first electrode 11 are not limited to the above-mentioned materials.

The second electrode 12 is formed by applying a second electrode active material to a second electrode collector plate formed of a metal foil, such as a copper or nickel foil, for example. The second electrode 12 includes a second electrode non-coating portion 12a to which the second electrode active metal is not applied. The second electrode non-coating portion 12a functions as a current flow path between the second electrode 12 and an outside of the second electrode 12. However, according to embodiments of the present invention, materials that can be used to form the second electrode 12 are not limited to the above-mentioned materials.

The separator 13 is located between the first electrode 11 and the second electrode 12 to prevent or substantially prevent a short circuit and allow movement of lithium ions. The separator 13 may be formed of a polyethylene film, a polypropylene film, or a film including polyethylene and polypropylene, for example.

The first and second collector plates 20 and 30 are coupled to both end parts of the electrode assembly 10 in a manner such that they are electrically connected to the first and second electrodes 11 and 12, respectively.

Figure 3:
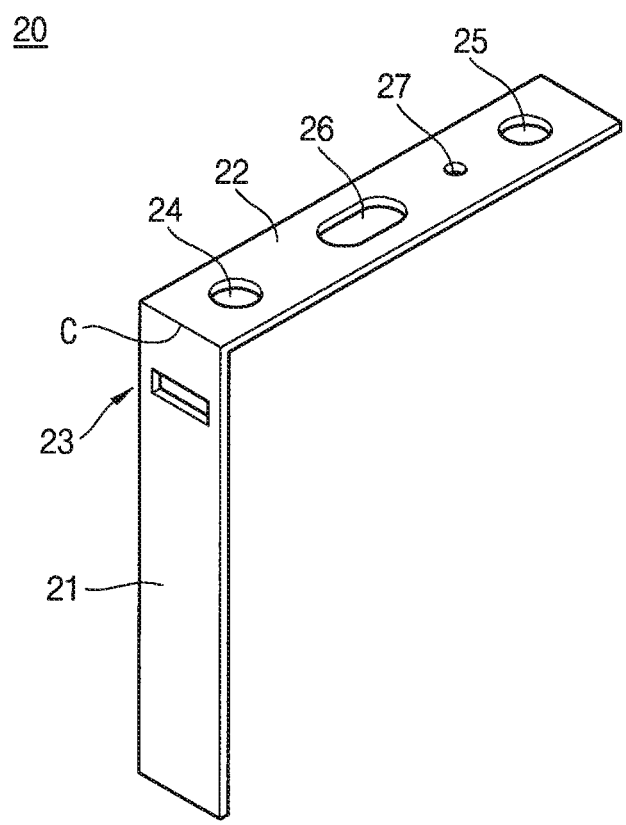
FIG. 3 is a perspective view of a first collector plate of the secondary battery of FIG. 1, according to an embodiment of the present invention.

Referring to FIG. 3, the first collector plate 20 includes a first connection part 21 and a first extension part 22. The first collector plate 20 is made of a conductive material, such as aluminum or an aluminum alloy, for example. The first collector plate 20 is electrically connected to the first electrode 11 of the electrode assembly 10.

The first connection part 21, in one embodiment, is shaped as a plate substantially contacting the first electrode non-coating portion 11a. The first extension part 22 is shaped as a plate and extends in parallel with a cap plate 51 and is described further below. A bent portion at which the first connection part 21 and the first extension part 22 meet is denoted by reference designator "C." The first connection part 21 and the first extension part 22 may be perpendicular to each other about the bent portion C.

In one embodiment, a fuse part 23 is formed at the first connection part 21. The fuse part 23 may be formed at a position of the first connection part 21 adjacent to the bent portion C. The fuse part 23, in one embodiment, has a penetration hole such that a cross-sectional area of a remaining portion of the fuse part 23 is smaller than a cross-sectional area of other portions of the first connection part 21. The penetration hole may be shaped as a rectangle elongated in a widthwise direction of the first connection part 21, but the present invention does not limit the shape of the penetration hole thereto. The fuse part 23 includes a fuse area of the penetration hole positioned between opposite end parts of the first connection part 21, and a width of the fuse area may be smaller than a width of the first connection part 21. The fuse area is melted by heat generated when a large amount of current flows in the first collector plate 20. If the fuse area is melted, the flow of current between the first electrode terminal 52 and the electrode assembly 10 is interrupted or shut down.

In one embodiment, a first electrode terminal hole 24, a coupling hole 25, a vent hole 26, and an electrolyte injection hole 27 are formed in the first extension part 22.

The first electrode terminal hole 24 provides a space to which the first electrode terminal 52 is fitted and coupled. The first electrode terminal hole 24, in one embodiment, is positioned at one side of the first extension part 22 and formed to be close to the bent portion C.

The coupling hole 25 provides a space in which the short-circuit member 60 is received and coupled to the first extension part 22. The coupling hole 25, in one embodiment, is positioned at the other side of the first extension part 22 and formed to be distal from the bent portion C. In one embodiment, the coupling hole 25 is positioned to be closest to the other side of the first extension part 22, among the first electrode terminal hole 24, the coupling hole 25, the vent hole 26, and the electrolyte injection hole 27. The vent hole 26 and the electrolyte injection hole 27 may be formed between the first electrode terminal hole 24 and the coupling hole 25.

Figure 4:
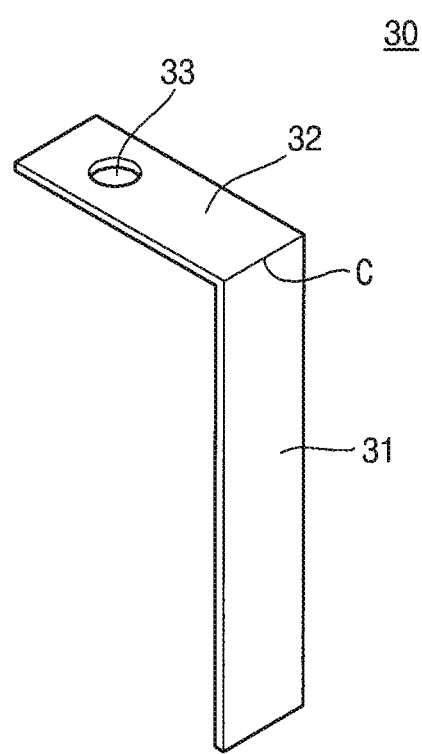
FIG. 4 is a perspective view of a second collector plate of the secondary battery of FIG. 1, according to an embodiment of the present invention.

Referring to FIG. 4, the second collector plate 30 includes a second connection part 31 and a second extension part 32. The second collector plate 30 is made of a conductive material, such as copper, a copper alloy, nickel, or a nickel alloy, for example. The second collector plate 30 is electrically connected to the second electrode 12.

The second connection part 31, in one embodiment, is shaped as a plate substantially contacting the second electrode non-coating portion 12*a*. The second extension part 32 is shaped as a plate and extends in parallel with the cap plate 51. A bent portion at which the second connection part 31 and the second extension part 32 meet is denoted by the reference designator "C." The second connection part 31 and the second extension part 32 may be perpendicular to each other about the bent portion C. A second electrode terminal hole 33, which is a space in which the second electrode terminal 53 is received and coupled to the second extension part 32, is formed in the second extension part 32.

The case 40, in one embodiment, may be formed of a conductive metal, such as aluminum, an aluminum alloy, or nickel-plated steel, for example, and may have an approximately hexahedron shape with an opening such that the electrode assembly 10, the first collector plate 20, and the second collector plate 30 may be inserted and received in the case 40. The case 40 and the cap assembly 50 are illustrated in an assembled state in FIG. 2, such that the opening of the case 40 is not shown. However, the opening corresponds to a substantially opened portion of the case 40 to which the cap assembly 50 is coupled. In one embodiment, an inner surface of the case 40 may be treated to be insulated from the electrode assembly 10 and the first and second collector plates 20 and 30. A top portion of the case 40 is finished through the cap plate 51, described further below. The case 40 may be maintained in a hermetically sealed state by performing laser welding on a contact portion between the case 40 and the cap plate 51. Since the cap plate 51 is electrically neutral, the case 40 is also electrically neutral.

The cap assembly 50 is coupled to the case 40. In one embodiment, the cap assembly 50 includes the cap plate 51, the first electrode terminal 52, the second electrode terminal 53, gaskets G, a first fastening terminal 54, and a second fastening terminal 55. The cap assembly 50, in one embodiment, further includes a first upper insulation member 58*a*, a second upper insulation member 58*b*, and a lower insulation member 59.

The cap plate 51 closes the opening of the case 40. The cap plate 51, in one embodiment, may be formed of a same material as the case 40. The cap plate 51, in one embodiment, includes a plug 56 and a safety vent 57. In one embodiment, penetration holes are formed in the cap plate 51 to allow the first electrode terminal 52, the second electrode terminal 53, and the short-circuit member 60 to pass through the penetration holes. The cap plate 51 is electrically insulated from the first electrode terminal 52 and the second electrode terminal 53 by the first upper insulation member 58*a* and the second upper insulation member 58*b*, such that the cap plate 51 is electrically neutral.

A top portion of the first electrode terminal 52 penetrates to the outside of the cap plate 51, and a bottom portion of the first electrode terminal 52 is electrically connected to the first collector plate 20. The first electrode terminal 52, in one embodiment, may be shaped as a pillar. The first fastening terminal 54 is coupled to a portion of the first electrode terminal 52 exposed at an upper portion of the cap plate 51. In one embodiment, a flange may be formed at a lower portion of the first electrode terminal 52 to prevent or substantially prevent the first electrode terminal 52 from being dislodged from the cap plate 51. The first electrode terminal 52 is fitted into the first electrode terminal hole 24 of the first collector plate 20. The first electrode terminal 52 is electrically insulated from the cap plate 51 by the first upper insulation member 58*a*. The first upper insulation member 58*a* is positioned between the first electrode terminal 52 and the cap plate 51. In addition, the gasket G is positioned between the first electrode terminal 52 and the cap plate 51, and the gasket G seals a gap between the first electrode terminal 52 and the cap plate 51. The gasket G prevents or substantially prevents permeation of moisture into the secondary battery 100 or leakage of electrolyte from the inside of the secondary battery 100.

A top portion of the second electrode terminal 53 penetrates to the outside of the cap plate 51, and a bottom portion of the second electrode terminal 53 is electrically connected to the second collector plate 30. The second electrode terminal 53, in one embodiment, has a same or substantially same shape as the first electrode terminal 52, and repeated description thereof will be omitted. The second electrode terminal 53 is electrically insulated from the cap plate 51 by the second upper insulation member 58*b*.

The second fastening terminal 55 is coupled to the second electrode terminal 53 exposed at the upper portion of the cap plate 51. The second fastening terminal 55 includes a short-circuit extension part 55*a* extending over a top portion of the short-circuit-member 60. In a normal operating state of the secondary battery 100, the short-circuit extension part 55*a* and the short-circuit member 60 are spaced apart from each other. The short-circuit extension part 55*a* is electrically connected to the second electrode terminal 53. If the internal pressure of the secondary battery 100 rises, such as due to overcharge or an external short circuit, a deformable part 63 of the short-circuit member 60 makes contact with a bottom surface of the short-circuit extension part 55*a*, thereby causing short circuiting.

The plug 56 closes an electrolyte injection part 56*a* of the cap plate 51. The safety vent 57 has a notch 57*a* formed in the safety vent 57 such that the safety vent 57 can be opened at a reference pressure (e.g., a preset pressure). The electrolyte injection hole 27 and the vent hole 26 are formed at positions of the first extension part 22 positioned under the cap plate 51 corresponding to the electrolyte injection part 56*a* and the safety vent 57, respectively.

The first upper insulation member 58*a* is positioned between the first electrode terminal 52 and the cap plate 51 and makes tight contact with the cap plate 51 and the gasket G. The first upper insulation member 58*a* insulates the first electrode terminal 52 from the cap plate 51.

The second upper insulation member 58*b* is positioned between the cap plate 60 and each of the second electrode terminal 53 and the short-circuit member 60 and the cap plate 51 and makes tight contact with the cap plate 51 and the gasket G. The second upper insulation member 58*b* insulates the second electrode terminal 53, the cap plate 51, and the short-circuit member 60 from each other. In one embodiment, the second upper insulation member 58*b* includes a first receiving groove 58*c* and a second receiving groove 58*d*. In one embodiment, the second electrode terminal 53 and the second fastening terminal 55 are received in the first receiving groove 58c, and the short-circuit member 60 and a supporting member 64 are positioned in the second receiving groove 58d.

The lower insulation member 59 is positioned between the cap plate 51 and the first collector plate 20 and the second collector plate 30. The lower insulation member 59 includes penetration holes formed at positions corresponding to the first electrode terminal hole 24, the safety vent 57, the electrolyte injection part 56a, the short-circuit member 60, and the second electrode terminal hole 33.

Figure 5A:
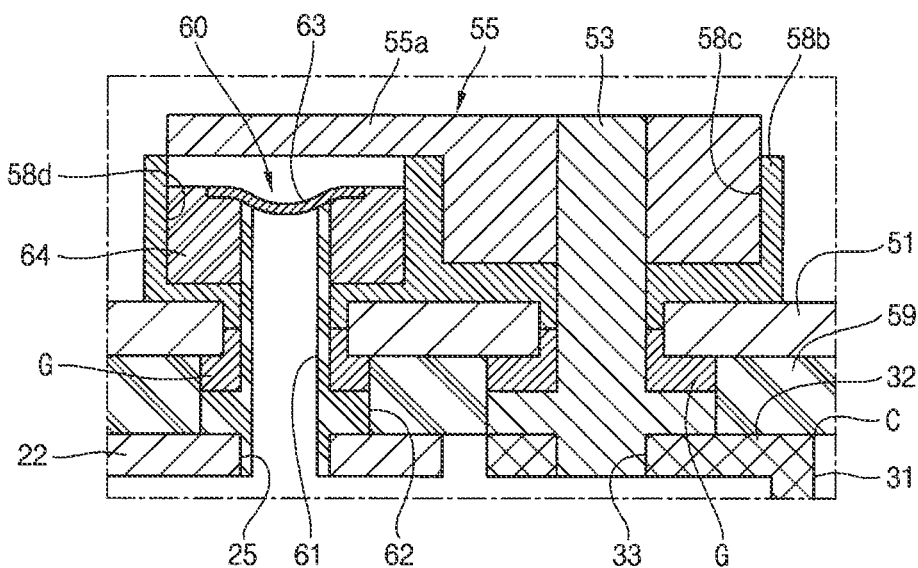
FIG. 5A is an enlarged sectional view of a region V of FIG. 2, illustrating a state in which a second electrode terminal and a short-circuit member are not short circuited.

Referring to FIG. 5A, the short-circuit member 60 includes a duct part 61 and a deformable part 63. A top portion of the short-circuit member 60 penetrates the cap plate 51, and a bottom portion of the short-circuit member 60 is electrically connected to the first collector plate 20. The short-circuit member 60 is configured to electrically connect the first electrode 11 to the second electrode 12 upon the generation of gases within the case 40, thereby causing short circuiting. The short-circuit member 60 is positioned under the short-circuit extension part 55a.

When the internal pressure of the secondary battery 100 exceeds a reference pressure (e.g., a set pressure), gases pass through the duct part 61 to the upper portion of the cap plate 51. An inlet is provided at one side of the duct part 61 to allow gases enter the duct part 61, and the deformable part 63 that is deformed by the introduced gases is provided at the other side of the duct part 61. In one embodiment, a flange 62 is formed outside the duct part 61, and a portion at a bottom of the flange 62 is fitted into the coupling hole 25. The supporting member 64 may be coupled to the other side of the duct part 61. The supporting member 64, in one embodiment, may be shaped as a rectangular plate, and a hole may be formed at a center of the plate to receive and be coupled to the duct part 61.

The deformable part 63, in one embodiment, is a round part that is convexly formed toward the inside of the case 40 and is inverted toward the outside of the case 40 when the deformable part 63 is deformed. The deformable part 63 is formed to cover the other side of the duct part 61 penetrating the cap plate 51. In one embodiment, the deformable part 63 may be fixed to the duct part 61 by welding a contact portion between the deformable part 63 and the duct part 61. In one embodiment, the deformable part 63 may increase a coupling force by welding a contact portion between the duct part 61 and the supporting member 64.

Figure 5B:
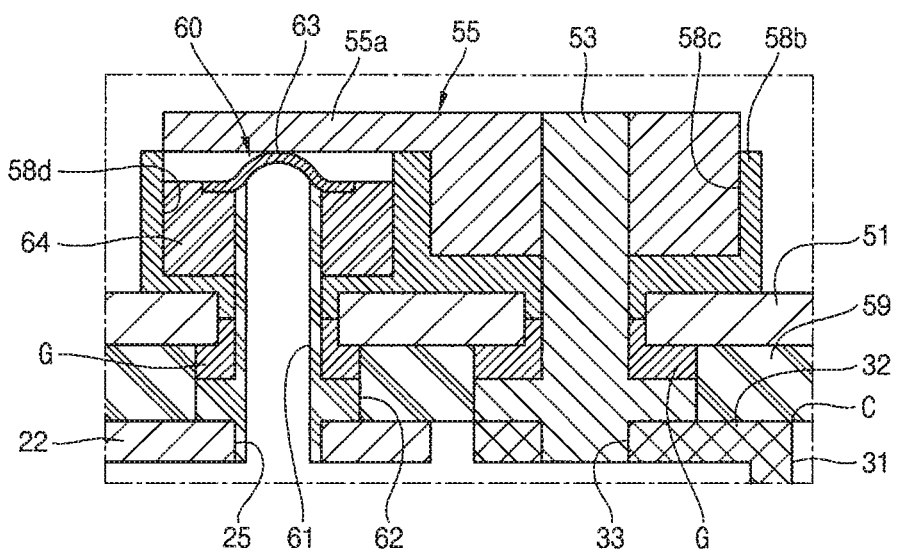
FIG. 5B is an enlarged sectional view of the region V of FIG. 2, illustrating a state in which the second electrode terminal and the short-circuit member contact each other and are short circuited.

Referring to FIG. 5B, when the internal pressure of the secondary battery 100 exceeds a reference pressure (e.g., a set pressure), the deformable part 63 is inverted to convexly protrude away from the electrode assembly 10. The deformable part 63, in one embodiment, may be made of aluminum, but is not limited thereto. The short-circuit extension part 55a of the second fastening terminal 55 is positioned over a top portion of the deformable part 63. The deformable part 63 is inverted to make contact with a bottom surface of the short-circuit extension part 55a.

In addition, when the internal pressure of the secondary battery 100 rises to greater than the reference pressure (e.g., a set pressure) due to overcharge or external short circuit, for example, the short-circuit member 60 is driven to allow the first electrode 11 and the second electrode 12 to be electrically connected to each other to operate the fuse part 23, thereby achieving safety in use.

Figure 6:
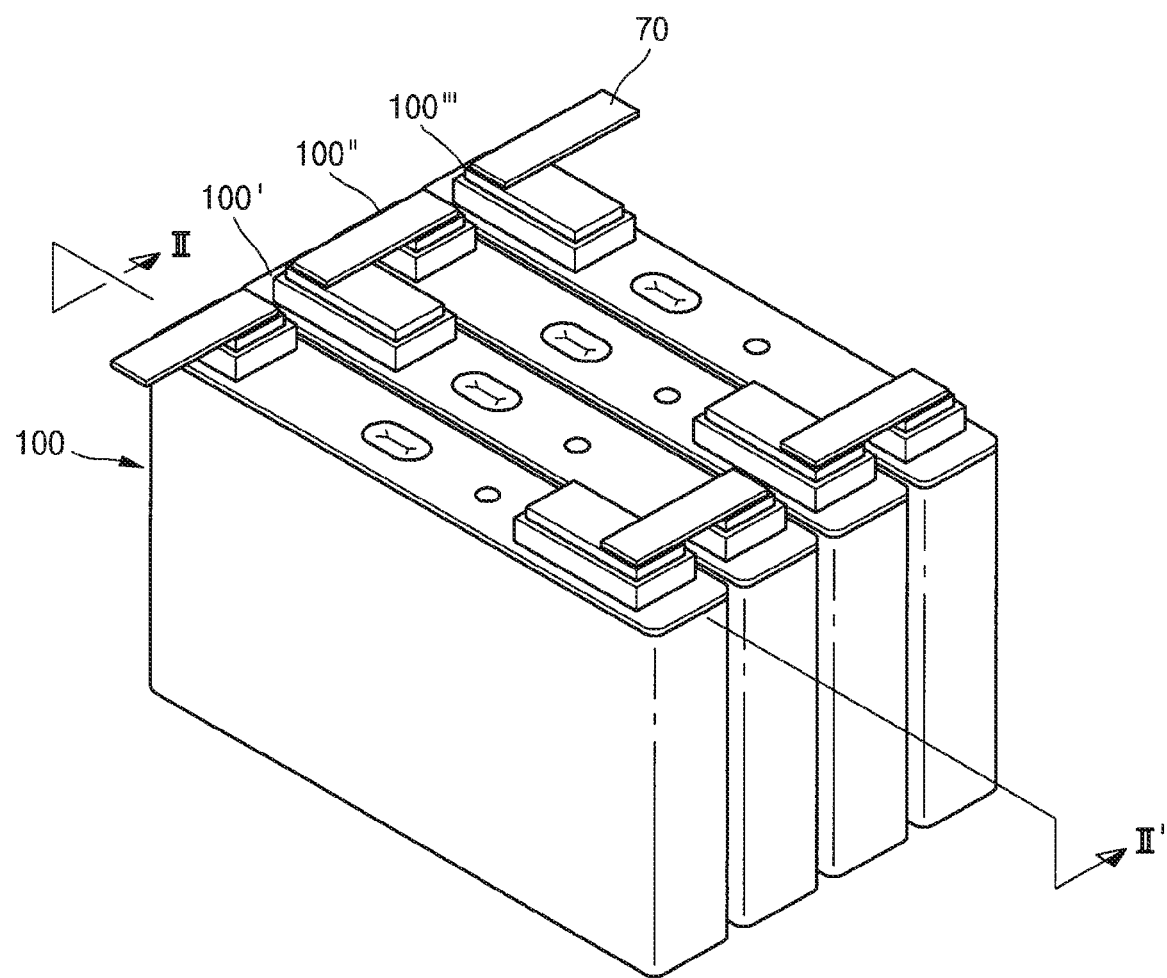
FIG. 6 is a perspective view of a battery pack including secondary batteries connected to each other by bus bars, according to an embodiment of the present invention.
Figure 7:
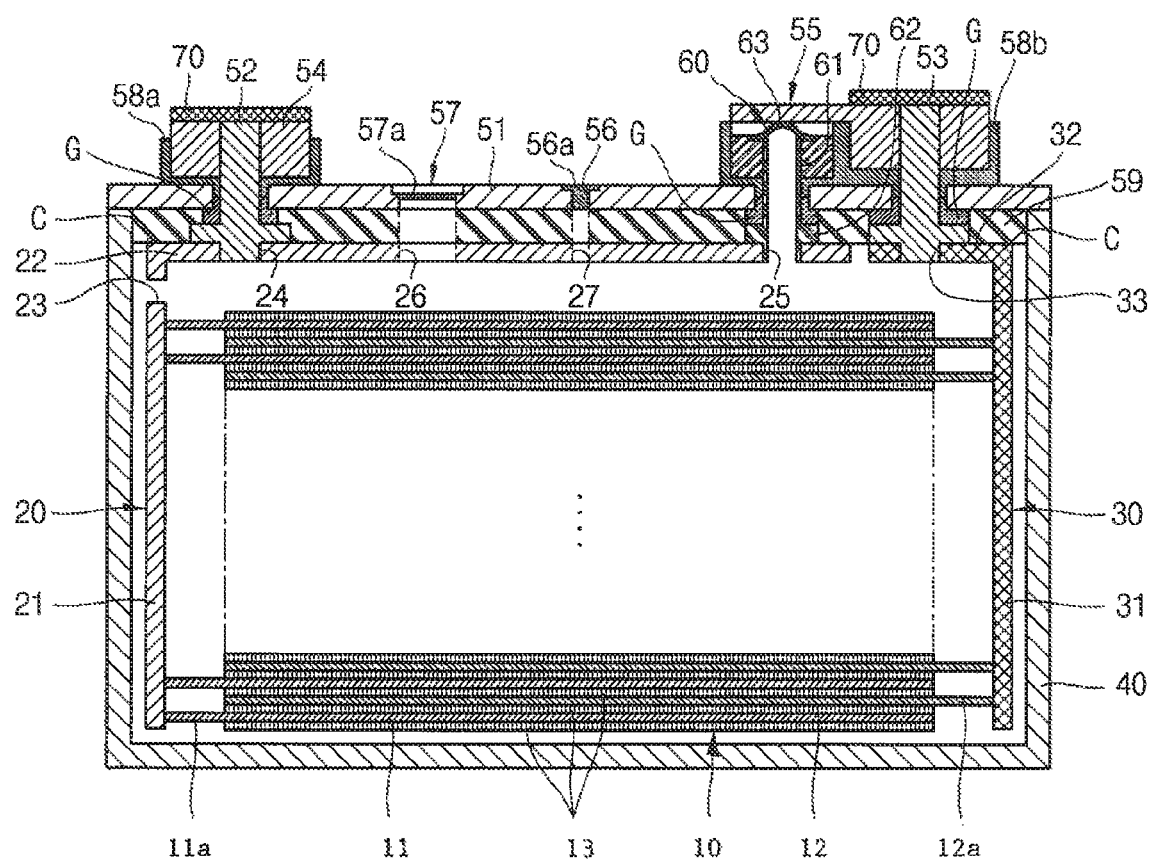
FIG. 7 is a sectional view of a secondary battery of the battery pack of FIG. 6, taken along the line II-II'.

Referring to FIGS. 6 and 7, a battery pack according to an embodiment of the present invention includes a plurality of secondary batteries 100, 100', 100", and 100'" connected to each other in series or in parallel by bus bars 70. In the battery pack, a case 40 and a cap plate 51 of each of the secondary batteries 100, 100', 100", and 100'" are at electrically neutral states. When an internal' pressure of one or more of the secondary batteries 100, 100', 100", and 100'" rises to or exceeds a reference pressure (e.g., a preset pressure), such as due to overcharge or external short circuit, the one or more of the secondary batteries 100, 100', 100", and 100'" is short circuited. In addition, the case 40 and the cap plate 51 of the short-circuited secondary battery 100 remain at electrically neutral states. As a result, the battery pack may be provided having safety and reliability.

In a state in which the case 40 and the cap plate 51 of the secondary battery 100 are electrically neutral, the short-circuit member 60 operates to electrically connect the first electrode 11 to the second electrode 12, causing short circuiting. Due to the short circuiting, the fuse part 23 is melted to interrupt or shut down the flow of current. When the internal pressure of the secondary battery 100 rises due to overcharge, etc., the short circuiting, caused due to contact between the deformed part 63 and the short-circuit extension part 55a (see FIG. 5B), is maintained, thereby allowing the fuse part 23 to serve as a fuse.

While some exemplary embodiments of a secondary battery have been described herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims and equivalents thereof.

What is claimed is:

1. A secondary battery comprising:
an electrode assembly including a first electrode, a second electrode, and a separator between the first electrode and the second electrode;
a first collector plate connected to the first electrode;
a second collector plate connected to the second electrode;
a case accommodating the electrode assembly, the first collector plate, and the second collector plate;
a cap plate sealing an opening of the case;
a first electrode terminal electrically connected to the first collector plate and passing through the cap plate;
a second electrode terminal electrically connected to the second collector plate and passing through the cap plate; and
a short-circuit member electrically connected to the first collector plate and passing through the cap plate, the short-circuit member comprising:
a duct part in communication with an inside of the case; and
a deformable part covering a top portion of the duct part and being deformable by a gas pressure inside the case to electrically connect the first electrode to the second electrode,
wherein the cap plate is electrically insulated from the first electrode terminal, the second electrode terminal, and the short-circuit member.

2. The secondary battery of claim 1, wherein the short-circuit member is arranged adjacent to the second electrode terminal and between the first electrode terminal and the second electrode terminal.

3. The secondary battery of claim 1, wherein the deformable part is a round part that is convexly formed toward the inside of the case and is inverted toward an outside of the case when the deformable part is deformed.

4. The secondary battery of claim 1, wherein the first collector plate includes a first connection part connected to the first electrode and having a fuse part, and a. first extension part bent and extending from a top portion of the first connection part, the first extension part extending parallel with the cap plate to an end adjacent to the second collector plate.

5. The secondary battery of claim 4, wherein the use part is adjacent to a corner portion at which the first extension part is bent from the first connection part, and is melted when an overcurrent flows.

6. The secondary battery of claim 4,
wherein the first extension part includes a first electrode terminal hole receiving the first electrode terminal, a coupling hole receiving the short-circuit member, a vent hole at a location corresponding to a safety vent of the cap plate, and an electrolyte injection hole at a location corresponding to an electrolyte injection part of the cap plate, and
wherein the vent hole and the electrolyte injection hole are between the first electrode terminal hole and the coupling hole.

7. The secondary battery of claim 6, wherein the coupling hole is adjacent to the end of the first extension part.

8. The secondary battery of claim 1, further comprising a fastening terminal fastened to the second electrode terminal, wherein the fastening terminal includes a short-circuit extension part extending over an upper side of the deformable part.

9. The secondary battery of claim 8, wherein, when the deformable part is deformed, it makes contact with a bottom surface of the short-circuit extension part.

10. The secondary battery of claim 8, further comprising an upper insulation member between the fastening terminal and the cap plate, the upper insulation member including a first receiving groove receiving the fastening terminal, and a second receiving groove receiving the short-circuit member protruding to an outside of the cap plate.

11. The secondary battery of claim 1, further comprising a lower insulation member between the cap plate and each of the first collector plate and the second collector plate, wherein the lower insulation member has penetration holes formed at positions corresponding to the short-circuit member and a first electrode terminal hole, a safety vent, an electrolyte injection part, and a second electrode terminal hole, which are formed in the cap plate.

12. The secondary battery of claim 1, further comprising a fastening terminal fastened to the first electrode terminal, and an upper insulation member between the fastening terminal and the cap plate.

* * * * *